US011899476B2

(12) United States Patent
Matsuda et al.

(10) Patent No.: US 11,899,476 B2
(45) Date of Patent: Feb. 13, 2024

(54) METHOD AND APPARATUS FOR MEASURING GAS FLOW

(71) Applicant: TOKYO ELECTRON LIMITED, Tokyo (JP)

(72) Inventors: Risako Matsuda, Miyagi (JP); Shinichiro Hayasaka, Miyagi (JP); Manabu Oie, Miyagi (JP); Keita Shouji, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 140 days.

(21) Appl. No.: 17/176,288

(22) Filed: Feb. 16, 2021

(65) Prior Publication Data

US 2021/0263540 A1   Aug. 26, 2021

(30) Foreign Application Priority Data

Feb. 21, 2020 (JP) ................ 2020-028490

(51) Int. Cl.
| | |
|---|---|
| G01F 1/34 | (2006.01) |
| G05D 7/06 | (2006.01) |
| G01F 7/00 | (2006.01) |
| G01F 1/86 | (2006.01) |
| G01F 1/50 | (2006.01) |
| G01F 15/00 | (2006.01) |
| G01F 15/02 | (2006.01) |

(52) U.S. Cl.
CPC ............. *G05D 7/0647* (2013.01); *G01F 1/34* (2013.01); *G01F 1/50* (2013.01); *G01F 1/86* (2013.01); *G01F 7/005* (2013.01); *G01F 15/005* (2013.01); *G01F 15/02* (2013.01); *G05D 7/0664* (2013.01)

(58) Field of Classification Search
CPC ................. G01F 1/34; G01F 1/50; G01F 1/86
USPC ...................................... 73/861.42
See application file for complete search history.

(56) References Cited

FOREIGN PATENT DOCUMENTS

JP   2012-32983 A   2/2012

*Primary Examiner* — John Fitzgerald
*Assistant Examiner* — Rodney T Frank
(74) *Attorney, Agent, or Firm* — XSENSUS LLP

(57) ABSTRACT

A gas flow measuring method is provided. A first pressure of a gas in a first and a second flow path is measured. A gas is supplied to the first and the second flow paths by repeating gas supply and stop of the gas supply, and a gas supply time is measured. A second pressure and a temperature of the gas in the first and the second flow path is measured, a third pressure of the gas in the second flow path is measured after the gas is exhausted from the second flow path, and a fourth pressure of the gas in the first and the second flow path is measured. The gas flow supplied to the first and the second flow path is calculated based on the first to fourth pressures and the temperature, and corrected based on a theoretical gas supply time and a calculated average time.

9 Claims, 9 Drawing Sheets

METHOD AND APPARATUS FOR MEASURING GAS FLOW

CROSS-REFERENCE TO RELATED APPLICATIONS

This application claims priority to Japanese Patent Application No. 2020-028490, filed on Feb. 21, 2020, the entire contents of which are incorporated herein by reference.

TECHNICAL FIELD

The present disclosure relates to a method and apparatus for measuring a gas flow.

BACKGROUND

A substrate processing for processing a substrate disposed in an inner space of a chamber by a gas supplied into the inner space is known. In this substrate processing, the gas flow affects the substrate and, thus, the gas flow is controlled by a flow controller with high accuracy. A build-up method is known as a gas flow measuring method (see Japanese Patent Application Publication No. 2012-32983).

SUMMARY

The present disclosure provides a gas flow measuring method and a gas flow measuring apparatus capable of measuring a gas flow with high accuracy.

In accordance with an aspect of the present disclosure, there is provided a gas flow measuring method comprising: measuring a first pressure of a gas filled in a first flow path connected to a flow controller and a second flow path connected to the first flow path; supplying, after the first pressure is measured, a gas to the first flow path and the second flow path by repeating multiple times (i) gas supply to the first flow path through the flow controller, and (ii) stop of the gas supply to the first path through the flow controller, after a predetermined time from a start of the gas supply to the first flow path through the flow controller; measuring a gas supply time from a signal for starting the gas supply to the first flow path to a signal for stopping the gas supply to the first flow path, the signals being outputted from a controller to the flow controller when the gas is supplied to the first flow path and the second flow path; measuring a second pressure and a temperature of the gas filled in the first flow path and the second flow path after the gas is supplied to the first flow path and the second flow path; measuring a third pressure of the gas filled in the second flow path after the gas is exhausted from the second flow path in a state where the first flow path and the second flow path are not connected to each other; measuring, after the third pressure is measured, a fourth pressure of the gas filled in the first flow path and the second flow path in a state where the first flow path and the second flow path are connected to each other; calculating a gas flow of the gas supplied to the first flow path and the second flow path through the flow controller based on the first pressure, the second pressure, the third pressure, the fourth pressure, and the temperature; calculating an average time of the gas supply time measured by repeating the gas supply and the stop of the gas supply multiple times; and correcting the calculated gas flow based on a theoretical gas supply time in the controller and the calculated average time.

BRIEF DESCRIPTION OF THE DRAWINGS

The objects and features of the present disclosure will become apparent from the following description of embodiments, given in conjunction with the accompanying drawings, in which.

DETAILED DESCRIPTION

Hereinafter, embodiments of a gas flow measuring method and a gas flow measuring apparatus will be described in detail with reference to the accompanying drawings. The following embodiments are not intended to limit the present disclosure.

In an atomic layer etching (ALE) process, it is required to control a gas flow with high accuracy. In other words, in order to control the gas flow with high accuracy, it is required to measure the gas flow with high accuracy in correcting a flow controller. If the control reproducibility of a control unit for controlling the flow controller is specified to, e.g., ±1%, a deviation in a measurement result may exceed ±1% or more due to timing delay of a control system or the like, which may lead to deterioration of correction accuracy. To put it another way, the measurement accuracy of the gas flow may deteriorate due to the timing delay of the control system or the like. Therefore, it is desired to measure the gas flow with high accuracy.

(Configuration of Substrate Processing System 10)

Figure 1:
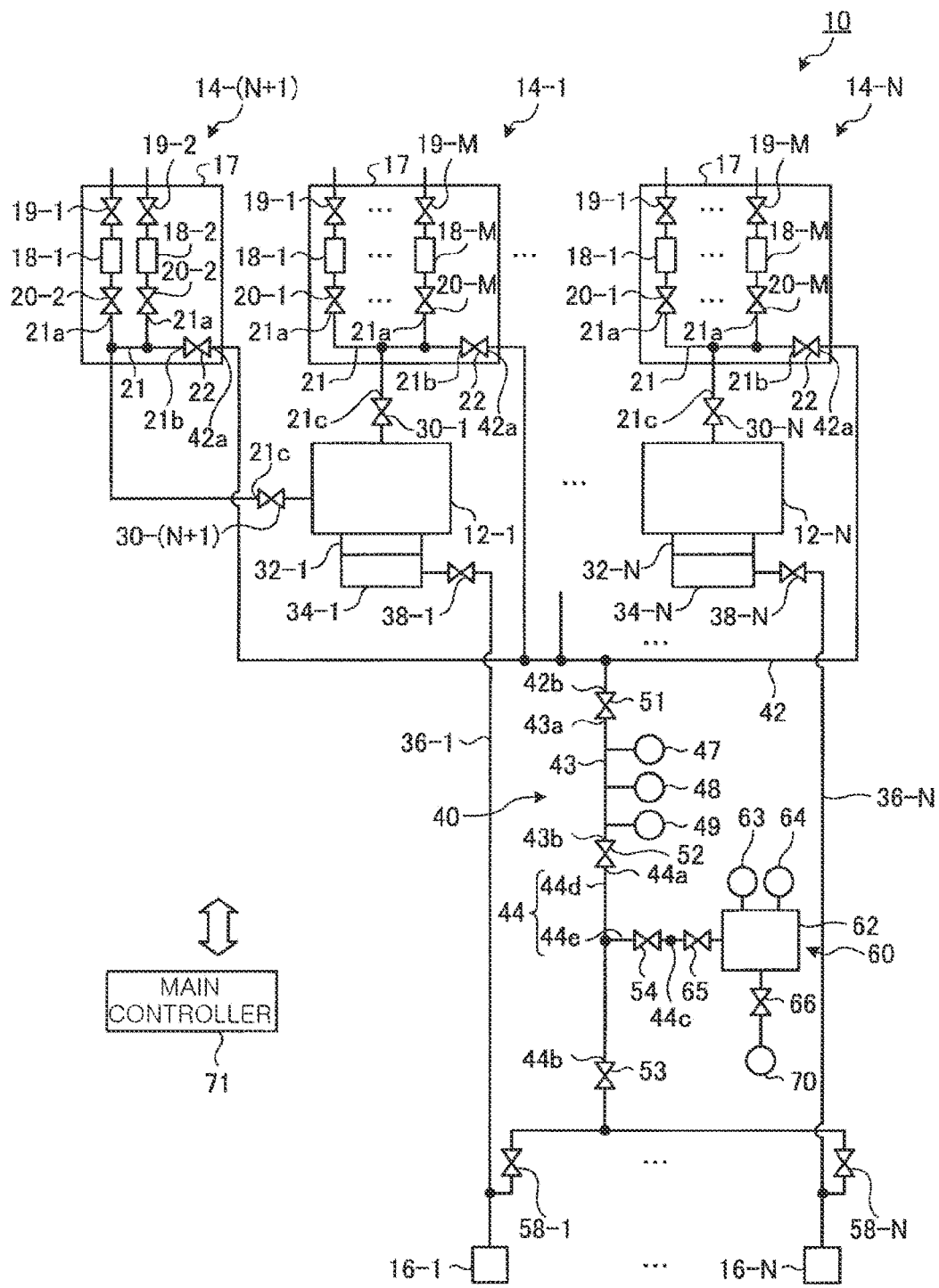
FIG. 1 schematically shows an example of a substrate processing system according to an embodiment.

FIG. 1 schematically shows an example of a substrate processing system according to an embodiment of the present disclosure. The substrate processing system 10 includes a plurality of process modules, e.g., a plurality of chambers 12-1 to 12-N (N being an integer more than or equal to 2) and a plurality of gas supply units 14-1 to 14-(N+1) as depicted in FIG. 1. Among the chambers 12-1 to 12-N, the chamber 12-1 has therein a processing space where a substrate is accommodated and processed. Each of the remaining chambers 12-$i$ ($i$=2, 3, 4, . . . , N) of the chambers 12-1 to 12-N has a processing space therein in a similar manner as the chamber 12-1.

Among the gas supply units 14-1 to 14-(N+1), the gas supply units 14-1 to 14-N correspond to the chambers 12-1 to 12-N, respectively. For example, the gas supply unit 14-1 corresponding to the chamber 12-1 includes a housing 17, a plurality of flow controllers 18-1 to 18-M (M being an integer more than or equal to 2), and a plurality of primary valves 19-1 to 19-M, a plurality of secondary valves 20-1 to 20-M, a first gas flow path 21, and a valve 22. The flow controllers 18-1 to 18-M, the primary valves 19-1 to 19-M, the secondary valves 20-1 to 20-M, and the valve 22 are disposed in the housing 17.

The plurality of flow controllers 18-1 to 18-M correspond to a plurality of gas sources (not shown) for supplying a plurality of different gases, respectively. Among the flow controllers 18-1 to 18-M, the flow controller 18-1 is a so-called mass flow controller and is connected to a gas source corresponding to the flow controller 18-1 among the gas sources. The plurality of primary valves 19-1 to 19-M correspond to the plurality of flow controllers 18-1 to 18-M, respectively. For example, the primary valve 19-1 corresponding to the flow controller 18-1 is connected to a primary side of the flow controller 18-1, and is disposed in a flow path that connects the flow controller 18-1 and the gas source.

The plurality of secondary valves 20-1 to 20-M correspond to the plurality of flow controllers 18-1 to 18-M, respectively. For example, the secondary valve 20-1 corresponding to the flow controller 18-1 is connected to the flow controller 18-1 such that the flow controller 18-1 is disposed between the primary valve 19-1 and the secondary valve 20-1. The remaining flow controllers 18-$j$ ($j$=2, 3, 4, . . . , M) of the flow controllers 18-1 to 18-M, are also disposed between the primary valve 19-$j$ and the secondary valve 20-$j$ in a similar manner as the flow controller 18-1.

The first gas flow path 21 has multiple first end portions 21$a$, a second end portion 21$b$, and a third end portion 21$c$. The first end portions 21$a$ are respectively connected to the secondary valves 20-1 to 20-M. The second end portion 21$b$ is connected to the valve 22. The portions of the first gas flow path 21 that connect the secondary valves 20-1 to 20-M and the valve 22 are disposed inside the housing 17.

The substrate processing system 10 further includes a plurality of valves 30-1 to 30-(N+1). Among the valves 30-1 to 30-(N+1), the valves 30-1 to 30-N correspond to the chambers 12-1 to 12-N, respectively. For example, one end of the valve 30-1 corresponding to the chamber 12-1 is connected to the third end portion 21$c$ of the first gas flow path 21 of the gas supply unit 14-1. The other end of the valve 30-1 is connected to the chamber 12-1 such that the valve 30-1 is disposed between the first gas flow path 21 and the chamber 12-1.

The remaining gas supply units 14-$i$ of the gas supply units 14-1 to 14-N are configured in a similar manner as the gas supply unit 14-1. In other words, the gas supply unit 14-$i$ includes a housing 17, a plurality of flow controllers 18-1 to 18-M, a plurality of primary valves 19-1 to 19-M, a plurality of secondary valves 20-1 to 20-M, a first gas flow path 21, and a valve 22. The valve 30-$i$ corresponding to the chamber 12-$i$ among the valves 30-1 to 30-N is disposed between the first gas flow path 21 and the chamber 12-$i$, and has one end connected to the third end portion 21$c$ and the other end connected to the chamber 12-$i$.

The gas supply unit 14-(N+1) of the gas supply units 14-1 to 14-(N+1) has two flow controllers 18-1 to 18-2, two primary valves 19-1 to 19-2, two secondary valves 20-1 to 20-2, a first gas flow path 21, and a valve 22. The two flow controllers 18-1 to 18-2 are connected to two liquid sources (not shown) for supplying two different liquids through the two primary valves 19-1 to 19-2. The valve 30-(N+1) of the valves 30-1 to 30-(N+1) has one end connected to the third end portion 21$c$ of the first gas flow path 21 of the gas supply unit 14-(N+1) and the other end connected to the chamber 12-1. The flow controller 18-1 of the gas supply unit 14-(N+1) is a so-called mass flow controller and has a function of vaporizing a liquid.

The substrate processing system 10 further includes a plurality of pressure control valves 32-1 to 32-N, a plurality of turbo molecular pumps 34-1 to 34-N, a plurality of gas exhaustion devices 16-1 to 16-N, a plurality of gas exhaustion paths 36-1 to 36-N, and a plurality of valves 38-1 to 38-N. The pressure control valves 32-1 to 32-N correspond to the chambers 12-1 to 12-N, respectively. For example, the pressure control valve 32-1 corresponding to the chamber 12-1 is a so-called automatic pressure control valve, and is configured to adjust a pressure in the inner space of the chamber 12-1. Each of the remaining pressure control valves 32-$i$ of the pressure control valves 32-1 to 32-N is also configured to adjust a pressure in the inner space of the chamber 12-$i$ in a similar manner as the pressure control valve 32-1.

The turbo molecular pumps 34-1 to 34-N correspond to the chambers 12-1 to 12-N, respectively. For example, the turbo molecular pump 34-1 corresponding to chamber 12-1 is connected to the processing space of chamber 12-1 through the pressure control valve 32-1. Each of the remaining turbo molecular pumps 34-$i$ of the turbo molecular pumps 34-1 to 34-N is also connected to the processing space of the chamber 12-$i$ through the pressure control valve 32-$i$ in a similar manner as the turbo molecular pump 34-1.

The gas exhaustion devices 16-1 to 16-N correspond to the chambers 12-1 to 12-N, respectively. The gas exhaustion paths 36-1 to 36-N correspond to the chambers 12-1 to 12-N, respectively. For example, the gas exhaustion device 16-1 corresponding to the chamber 12-1 is connected to the turbo molecular pump 34-1 through the gas exhaustion path 36-1 corresponding to the chamber 12-1. The gas exhaustion device 16-1 is a so-called dry pump. The valves 38-1 to 38-N correspond to the chambers 12-1 to 12-N, respectively. For example, the valve 38-1 corresponding to the chamber 12-1 is disposed in the gas exhaustion path 36-1.

Each of the remaining gas exhaustion devices 16-$i$ of the gas exhaustion devices 16-1 to 16-N is configured in a similar manner as the gas exhaustion device 16-1, and is connected to the turbo molecule pump 34-$i$ through the gas exhaustion path 36-$i$. Each of the remaining valves 38-$i$ of the valves 38-1 to 38-N is disposed in the gas exhaustion path 36-$i$ in a similar manner as the valve 38-1.

The substrate processing system 10 further includes a gas flow measurement system 40. The gas flow measurement system 40 includes a second gas flow path 42, a first valve 51, a third gas flow path 43, a second valve 52, a pressure sensor 47, a pressure sensor 48, and a temperature sensor 49. The second gas flow path 42 has multiple fourth end portions 42$a$ and a fifth end portion 42$b$. The fourth end portions 42$a$ are connected to the valves 22 of the gas supply units 14-1 to 14-(N+1), respectively. The fifth end portion 42$b$ is connected to the first valve 51.

The third gas flow path 43 has a sixth end portion 43$a$ and a seventh end portion 43$b$. The sixth end portion 43$a$ is connected to the first valve 51 such that the first valve 51 is disposed between the second gas flow path 42 and the third gas flow path 43. The seventh end portion 43$b$ is connected to the second valve 52. The pressure sensor 47 and the pressure sensor 48 are disposed at two different positions in the third gas flow path 43. The pressure sensor 47 and the pressure sensor 48 are configured to measure a pressure of a gas filled in the third gas flow path 43. The temperature sensor 49 is configured to measure a temperature of the gas filled in the third gas flow path 43.

The gas flow measurement system 40 further includes a fourth gas flow path 44, a third valve 53, and a fourth valve 54. The fourth gas flow path 44 includes a first flow subpath 44*d* and a second flow subpath 44*e*. The first flow subpath 44*d* has an eighth end portion 44*a* and a ninth end portion 44*b*. The second flow subpath 44*e* is branched from the first flow subpath 44*d*, and has a tenth end portion 44*c*. The fourth valve 54 is disposed in the second flow subpath 44*e*.

The eighth end portion 44*a* is connected to the second valve 52 such that the second valve 52 is disposed between the third gas flow path 43 and the fourth gas flow path 44. The ninth end portion 44*b* is connected to the third valve 53. Here, the gas exhaustion path 36-1 is branched between the valve 38-1 and the gas exhaustion device 16-1, and is connected to the third valve 53 such that the third valve 53 is disposed between the fourth gas flow path 44 and the gas exhaustion path 36-1. The remaining exhaust paths 36-*i* of the gas exhaustion paths 36-1 to 36-N are connected to the third valve 53 such that the third valve 53 is disposed between the gas flow path 44 and the gas exhaustion path 36-*i*, in a similar manner as the gas exhaustion path 36-1.

The gas flow measurement system 40 further includes a plurality of valves 58-1 to 58-N. The valves 58-1 to 58-N correspond to the chambers 12-1 to 12-N, respectively. For example, the valve 58-1 corresponding to the chamber 12-1 is disposed between the third valve 53 and the gas exhaustion path 36-1. Each of the remaining valves 58-*i* of the valves 58-1 to 58-N is disposed between the third valve 53 and the gas exhaustion path 3, in a similar manner as the valve 58-1.

The gas flow measurement system 40 further includes a reference device 60 and a reference pressure sensor 70. The reference device 60 includes a tank 62, a pressure sensor 63, a temperature sensor 64, a valve 65, and a valve 66. The tank 62 has an inner space. The pressure sensor 63 is configured to measure a pressure of a gas filled in the inner space of the tank 62. The temperature sensor 64 is configured to measure a temperature of the gas filled in the inner space of the tank 62. The valve 65 is disposed between the second flow subpath 44*e* of the fourth gas flow path 44 and the tank 62. The valve 66 is connected to the tank 62.

The reference pressure sensor 70 is connected to the inner space of the tank 62 through the valve 66. The reference pressure sensor 70 is configured to measure the pressure of the gas filled in the inner space of the tank 62 when it is connected to the inner space of the tank 62.

The substrate processing system 10 further includes a main controller 71. The main controller 71 is a computer device, and includes a processor, a storage device, an input device, and a display device. The processor is, e.g., a CPU, and processes information by executing a computer program installed in the main controller 71 to control the storage device, the input device, and the display device. The processor controls the respective components of the substrate processing system 10 and the respective components of the gas flow measurement system 40 by executing the computer program. The storage device stores the computer program and records the information used by the processor. The input device is, e.g., a keyboard, and outputs information generated by a user's operation to the processor. The display device outputs the information generated by the processor so that the user can recognize the information.

Figure 2:
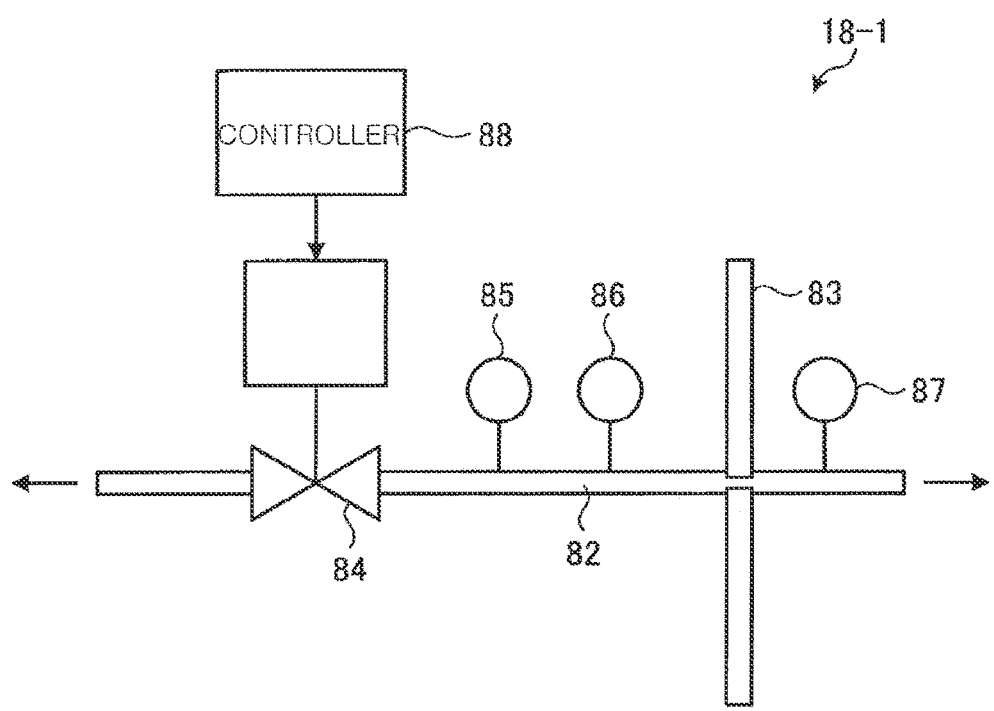
FIG. 2 presents an example of a flow controller according to the embodiment.

FIG. 2 illustrates an example of the flow controller according to the embodiment. As shown in FIG. 2, the flow controller 18-1 is a mass flow controller or a pressure-control type flow controller. The flow controller 18-1 includes a flow path 82, an orifice member 83, a control valve 84, a pressure sensor 85, a temperature sensor 86, a pressure sensor 87, and a controller 88. The flow path 82 is disposed between the primary valve 19-1 and the secondary valve 20-1, and has one end connected to the primary valve 19-1 and the other end connected to the secondary valve 20-1. The orifice member 83 is disposed in the flow path 82, and reduces a part of a cross-sectional area of the flow path. The control valve 84 is disposed between the primary valve 19-1 and the orifice member 83 in the flow path 82. The pressure sensor 85 is disposed between the control valve 84 and the office member 83 in the flow path 82. The pressure sensor 85 is configured to measure a pressure of a gas filled in the space between the control valve 84 and the orifice member 83 in the flow path 82. The temperature sensor 86 is configured to measure a temperature of the gas filled between the control valve 84 and the orientation member 83 in the flow path 82. The pressure sensor 87 is configured to measure a pressure of the gas filled in the space between the secondary valve 20-1 and the orifice member 83 in the flow path 82.

The controller 88 controls the pressure sensor 85 to measure the pressure of the gas filled in the space between the primary valve 19-1 and the orifice member 83 in the flow path 82. The controller 88 controls the pressure sensor 87 to measure the pressure of the gas filled in the space between the secondary valve 20-1 side and the orifice member 83 in the flow path 82. The controller 88 calculates the gas flow based on the pressure measured by the pressure sensor 85 when the pressure in the space between the primary valve 19-1 and the orifice member 83 is twice or more higher than the pressure in the space between the secondary valve 20-1 and the orifice member 83. The controller 88 calculates the gas flow based on the pressure measured by the pressure sensor 85 and the pressure measured by the pressure sensor 87 when the pressure in the space between the primary valve 19-1 and the orifice member 83 is lower than a half of the pressure in the space between the secondary valve 20-1 and the orifice member 83. The controller 88 controls how much the control valve 84 should be opened such that the difference between the calculated gas flow and the set gas flow is reduced. The flow controller 18-1 does not need the pressure sensor 87 when the pressure in the primary side from the orifice member 83 (upstream side) is twice or more higher than the pressure in the secondary side from the orifice member 83 (downstream side) in the flow path 82.

(Gas Flow Measuring Method)

Figure 3:
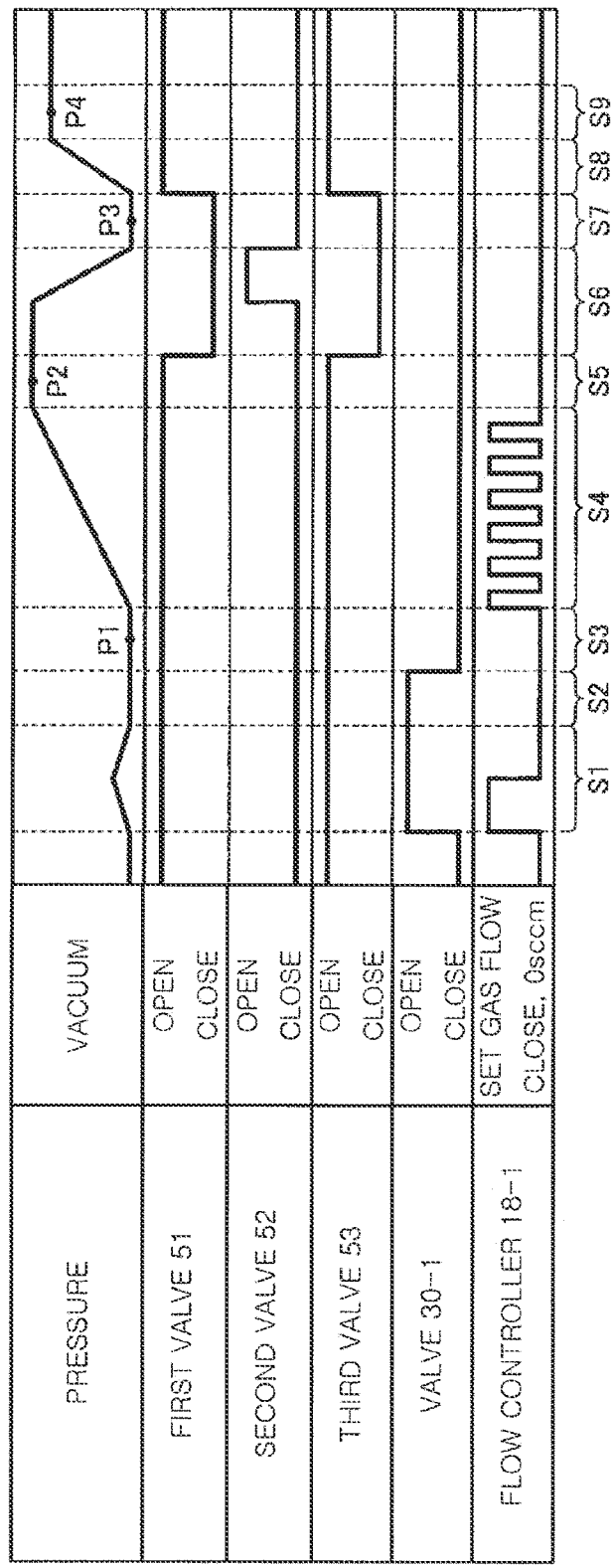
FIG. 3 is a sequence chart showing an example of a gas flow measuring method according to an embodiment.

FIG. 3 is a sequence chart showing an example of the gas flow measuring method according to an embodiment. The horizontal axis of the sequence chart in FIG. 3 represents time. The vertical axis represents a pressure of the third gas flow path 43, an opening/closing state of the first valve 51, an opening/closing state of the second valve 52, and an opening/closing state of the third valve 53. The vertical axis further represents an opening/closing state of the valve 30-1 and a gas output state of the flow controller 18-1.

In the gas flow measuring method, initially, the first valve 51 and the third valve 53 are opened, and the second valve 52, the valve 30-1 and the fourth valve 54 are closed. First, the main controller 71 opens the valve 30-1 to connect the first gas flow path 21 and the processing space of the chamber 12-1. The main controller 71 further controls the gas supply unit 14-1 to supply a gas from one gas source corresponding to the flow controller 18-1 among the plurality of gas sources to the first gas flow path 21 (step S1). The gas in the flow controller 18-1 is replaced with the gas supplied from the gas source to the first gas flow path 21. After the gas in the flow controller 18-1 is sufficiently purged, the main controller 71 controls the gas supply unit 14-1 to stop the gas supply from the gas source to the first gas flow path 21.

After the gas supply from the gas source to the first gas flow path 21 is stopped, the main controller 71 controls the turbo molecular pump 34-1 to exhaust the gas filled in the processing space of the chamber 12-1 (step S2). The gas is exhausted from the processing space of the chamber 12-1 so that the first gas flow path 21, the second gas flow path 42, and the third gas flow path 43 are vacuumized to a predetermined vacuum level. After the first gas flow path 21, the second gas flow path 42, and the third gas flow path 43 reach the predetermined vacuum level, the main controller 71 closes the valve 30-1 to shut off the first gas flow path 21 from the processing space of the chamber 12-1. After the first gas flow path 21 is shut off from the processing space of the chamber 12-1, the main controller 71 controls the pressure sensor 47 to measure a pressure P1 in the first gas flow path 21, the second gas flow path 42, the third gas flow path 43 (step S3).

After the pressure P1 is measured, the main controller 71 controls the gas supply unit 14-1 to supply the gas from the gas source to the first gas flow path 21 (step S4). The gas is supplied to the first gas flow path 21 by repeating a predetermined process a predetermined number of times, i.e., by generating a plurality of gas pulses. Each of the gas pulses is formed by supplying the gas to the first gas flow path 21 through the flow controller 18-1 and stopping the gas supply after a predetermined time from a start of the gas supply. The main controller 71 controls the temperature sensor 86 of the flow controller 18-1 to measure a temperature Tstray of the gas filled in the flow path 82.

Further, the main controller 71 measures a gas supply time from a signal for starting the gas supply to the first gas flow path 21 to a signal for stopping the gas supply to the first gas flow path 21, the signals being outputted from the main controller 71 to the flow controller 18-1 when the gas is supplied to the first gas flow path 21. In other words, the main controller 71 measures, as the gas supply time, the time between an opening signal and a closing signal for the flow controller 18-1 in each gas pulse that are outputted from the main controller 71.

The gas supplied to the first gas flow path 21 through the flow controller 18-1 is uniformly diffused to the first gas flow path 21, the second gas flow path 42, and the second gas flow path 21 as a predetermined time elapses. The pressure of the gas filled in the first gas flow path 21, the second gas flow path 42, and the third gas flow path 43 is stabilized by sufficient diffusion of the gas. After the gas supplied to the first gas flow path 21 through the flow controller 18-1 is sufficiently diffused, the main controller 71 controls the pressure sensor 47 to measure a pressure P2 in the first gas flow path 21, the second gas flow path 42, and the third gas flow path 43. The main controller 71 further controls the temperature sensor 49 to measure a temperature Tfv in the third gas flow path 43 (step S5).

After the pressure P2 is measured, the main controller 71 closes the first valve 51 to shut off the third gas flow path 43 from the first gas flow path 21 and the second gas flow path 42 (step S6). After the pressure P2 is measured, the main controller 71 also closes the third valve 53 to shut off the third gas flow path 43 from the gas exhaustion devices 16-1 to 16-N.

After the first valve 51 and the third valve 53 are closed, the main controller 71 opens the second valve 52 to connect the third gas flow path 43 and the fourth gas flow path 44. Due to the connection between the third gas flow path 43 to the fourth gas flow path 44, a part of the gas filled in the third gas flow path 43 is exhausted to a portion in the fourth gas flow path 44 surrounded by the second valve 52, the third valve 53, and the fourth valve 54. After a part of the gas filled in the third gas flow path 43 is exhausted to the fourth gas flow path 44, the main controller 71 closes the second valve 52 to shut off the third gas flow path 43 from the fourth gas flow path 44.

The gas remaining in the third gas flow path 43 is uniformly diffused in the third gas flow path 43 as a predetermined time elapses, so that the pressure of the gas filled in the third gas flow path 43 becomes stable. After the gas remaining in the third gas flow path 43 is sufficiently diffused, the main controller 71 controls the pressure sensor 47 to measure a pressure P3 in the third gas flow path 43 (step S7). After the pressure P3 is measured, the main controller 71 opens the third valve 53 to connect the fourth gas flow path 44 and the gas exhaustion devices 16-1 to 16-N. By opening the third valve 53, the gas in the portion of the fourth gas flow path 44 surrounded by the second valve 52, the third valve 53, and the fourth valve 54 is exhausted by the gas exhaustion devices 16-1 to 16-N.

After the pressure P3 is measured, the main controller 71 further opens the first valve 51 to connect the third gas flow path 43 with the first gas flow path 21 and the second gas flow path 21. By opening the first valve 51, a part of the gas in the first gas flow path 21 and the second gas flow path 42 is moved to the third gas flow path 43, and diffused to the first gas flow path 21, the second gas flow path 42, and the third gas flow path 43. The pressure of the gas filled in the first gas flow path 21, the second gas flow path 42, and the third gas flow path 43 is stabilized by the sufficient diffusion of the gas. After the gas is sufficiently diffused, the main controller 71 controls the pressure sensor 47 to measure a pressure P4 in the first gas flow path 21, the second gas flow path 42, and the third gas flow path 43 (step S9).

A gas flow Q of the gas supplied through the flow controller 18-1 to the first gas flow path 21 per unit time in step S4 is expressed by the following equation (1) using a gas constant R:

$$Q = dP/dt \times 1/R \times (Vstray/Tstray + Vext/Text + Vfv/Tfv) \quad \text{Eq. (1).}$$

Here, dP is expressed by the following equation using the pressure P1 and the pressure P2:

$$dP = P2 - P1$$

where dt indicates a time $\Delta t$ during which the gas is supplied to the first gas flow path 21 through the flow controller 18-1 in step S4. A volume Vstray indicates a volume between a diaphragm of the secondary valve 20-1 and the orifice member 83 in the flow path 82 of the flow controller 18-1. The temperature Tstray indicates a temperature of the gas flowing through the flow path 82 of the flow controller 18-1 that is measured by the temperature sensor 86 of the flow controller 18-1. A volume Vext indicates a sum of a volume of the first gas flow path 21 and a volume of a second gas flow path 42. A temperature Text indicates a temperature of a gas filled in the first gas flow path 21 and the second gas flow path 42 at the time of measuring the pressure P2. A volume Vfv indicates a volume of the third gas flow path 43. A temperature Tfv indicates a temperature of a gas filled in the third gas flow path 43 at the time of measuring the pressure P2.

The following equation (2) is satisfied according to Boyle-Charles' law:

$$P2 \times Vext/Text + P3 \times Vfv/Tfv = P4 \times Vext/Text + P4 \times Vfv/Tfv \quad \text{Eq. (2).}$$

The equation (2) can be rearranged to obtain the following equation (3):

$$Vext/Text = Vfv/Tfv \times (P4-P3)/(P2-P4) \quad \text{Eq. (3).}$$

By applying the equation (3) to the equation (1), the following equation (4) is obtained:

$$Q = (P2-P1)/\Delta t \times 1/Rx\{Vstray/Tstray + Vfv/Tfv \times (P2-P3)/(P2-P4)\} \quad \text{Eq. (4).}$$

Therefore, the number of moles "n" of the gas supplied to the first gas flow path 21 through the flow controller 18-1 in step S4 is expressed by the following equation (5):

$$n = (P2-P1)/Rx\{Vstray/Tstray + Vfv/Tfv \times (P2-P3)/(P2-P4)\} \quad \text{Eq. (5).}$$

Here, a value obtained by dividing the number of moles "n" by the number of the gas pulses generated in step S4 indicates the amount of gas supplied to the first gas flow path 21 through the flow controller 18-1 per gas pulse.

(Specific Description of Gas Pulse)

Figure 4:
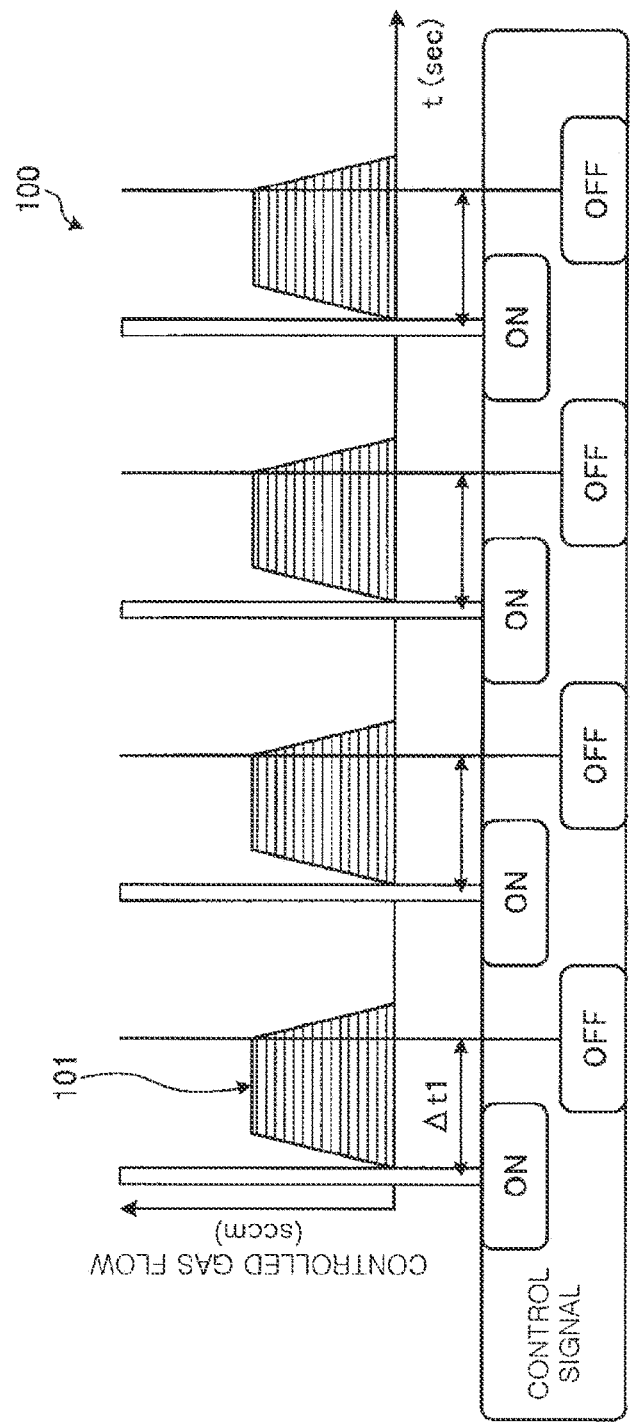
FIG. 4 illustrates an example of a relationship between a control signal and a gas pulse in step S4.

Hereinafter, the gas pulse will be described in detail with reference to FIGS. 4 and 5. FIG. 4 shows an example of a relationship between a control signal and a gas pulse in step S4. As depicted in a graph 100 of FIG. 4, a gas pulse 101 is formed by switching ON/OFF, i.e., opening/closing state, using a control signal outputted from the main controller 71 to the flow controller 18-1. That is, as the control signal, an opening signal corresponding to ON and a closing signal corresponding to OFF are alternately outputted. Further, a time Δt1 from the opening signal to the closing signal indicates a time during which a gas is supplied to the first gas flow path 21. In the following description, the time Δt1 from the opening signal to the closing signal may be expressed as the gas supply time Δt1.

An error may occur in the opening signal due to the control accuracy in the main controller 71, the timing delay in the communication path from the main controller 71 to the flow controller 18-1, and the like. The error in the main controller 71 may be caused by, e.g., a difference in the timing depending on whether a command is sent to a device (e.g., an RF-related device) that operates during the normal process but does not operate during the gas flow measurement. Further, the error in the communication path may be caused by, e.g., delay in various boards connected to the communication path from the main controller 71 to the flow controller 18-1. In other word, as shown in FIG. 4, the time required until the flow controller 18-1 receives the opening signal varies and, thus, the gas supply time Δt1 also varies. For instance, when the reproducibility of the gas supply time Δt1 of each gas pulse (each STEP) is about ±2%, the average time of the gas supply time Δt1 of all the gas pulses (all STEPs) in step S4, i.e., the reproducibility for each wafer to be processed is about ±1%. Since the closing signal is fixed by the switching time of the ALE process, it can be considered that there is substantially no error in each gas pulse.

Figure 5:
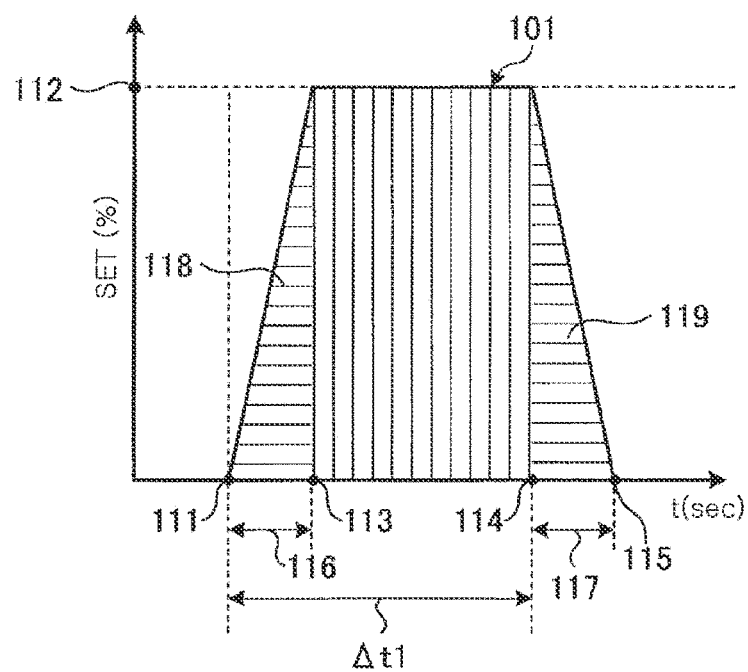
FIG. 5 depicts an example of the gas pulse in step S4.

FIG. 5 shows an example of the gas pulse in step S4. In the gas pulse 101 shown in FIG. 5, the amount of the gas flow supplied from the flow controller 18-1 to the first gas flow path 21 gradually increases after a time point 111 when the flow controller 18-1 of the gas supply unit 14-1 is controlled by the opening signal. The gas flow is not changed and substantially fixed to a predetermined set gas flow 112 after a time point 113 when the gas flow reaches the predetermined set gas flow 112. The flow controller 18-1 is controlled to stop the gas supply to the first gas flow path 21 at a time point 114 when the gas supply time Δt1 elapses from the time point 111. The gas flow gradually decreases after the time point 114. The gas flow becomes substantially equal to zero after a time point 115 after the time point 114, and the gas supply from the flow controller 18-1 to the first gas flow path 21 is stopped.

When transient response periods 116 and 117 are sufficiently short, the amount of gas supplied to the first gas flow path 21 by one gas pulse is substantially equal to a value obtained by multiplying the predetermined set gas flow 112 by the gas supply time Δt1. When the ratio of the lengths of the transient response periods 116 and 117 to the gas supply time Δt1 is large, the error in the amount of gas supplied to the first gas flow path 21 by one gas pulse may be increased.

In the gas flow measuring method, the number of moles "n" of the gas supplied to the first gas flow path 21 through the flow controller 18-1 in step S4 is calculated with high accuracy. Therefore, in the gas flow measuring method, even when the ratio of the transient response period 116 and the transient response period 117 to the gas supply time Δt1 is large, the number of moles "n" of the gas supplied to the gas flow path 21 through the flow controller 18-1 can be calculated with high accuracy in step S4. Since the number of moles "n" is calculated with high accuracy in the gas flow measuring method, the amount of gas supplied to the first gas flow path 21 through the flow controller 18-1 per gas pulse can be calculated with high accuracy.

The amount of gas supplied to the first gas flow path 21 through the flow controller 18-$i$, other than the flow controller 18-1, among the flow controllers 18-1 to 18-M is calculated in the same manner as that for the flow controller 18-1. The amount of gas supplied from the gas supply unit 14-$i$, other than the gas supply unit 14-1, among the gas supply units 14-1 to 14-N to the first gas flow path 21 through the flow controllers 18-1 to 18-M is calculated in the same manner as that for the gas supply unit 14-1.

The length of the transient response period 116 from the time point 111 to the time point 113 and the length of the transient response period 117 from the time point 114 to the time point 115 may be different depending on the flow control devices 18-1 to 18-M. Further, the amount of gas flow 118 supplied to the first gas flow path 21 during the transient response period 116 and the amount of gas flow 119 supplied to the first gas flow path 21 during the transient response period 117 may be different depending on the flow controllers 18-1 to 18-M.

In the gas flow measuring method, the number of moles "n" of the gas supplied to the first gas flow path 21 through the flow controller 18-1 in step S4 is calculated with high accuracy. Therefore, in the gas flow measuring method, even when the amount of gas flow 118 and the amount of gas flow 119 vary depending on the flow controllers 18-1 to 18-M, the amount of gas supplied to the first gas flow path 21 through the flow controller 18-1 per gas pulse can be calculated with high accuracy.

To put it another way, in the present embodiment, the amount of a gas flow with respect to a gas pulse including the transient response period can be calculated with higher accuracy by further correcting the calculated gas flow based on the variation in the time required until the flow controller 18-1 receives the opening signal.

The main controller 71 calculates an average time Ta of the gas supply time Δt1 measured for each of the plurality of gas pulses included in step S4. However, when the gas supply time Δt1 exceeds a maximum value of a theoretical gas supply time Ts set in the recipe, the theoretical gas supply time Ts is used instead of the gas supply time Δt1. The main controller 71 calculates a correction coefficient cf using the following equation (6) based on the theoretical gas supply time Ts and the calculated average time Ta:

$$cf = Ts/Ta \quad \text{Eq. (6).}$$

The main controller 71 calculates a corrected gas flow Qc by multiplying the gas flow Q by the correction coefficient cf.

The substrate processing system 10 is used to process a substrate in a state where the valves 22 of the gas supply units 14-1 to 14-(N+1) are closed after the gas flow measuring method is performed. By adjusting the number of gas pulses, the substrate processing system 10 can adjust the amount of gas supplied to the processing space of the chamber 12-1 through the flow controller 18-1 with high accuracy. The substrate processing system 10 can appropriately process the substrate by adjusting the amount of gas supplied to the processing space of the chamber 12-1 through the flow controller 18-1 with high accuracy.

(Measurement Result)

Figure 6:
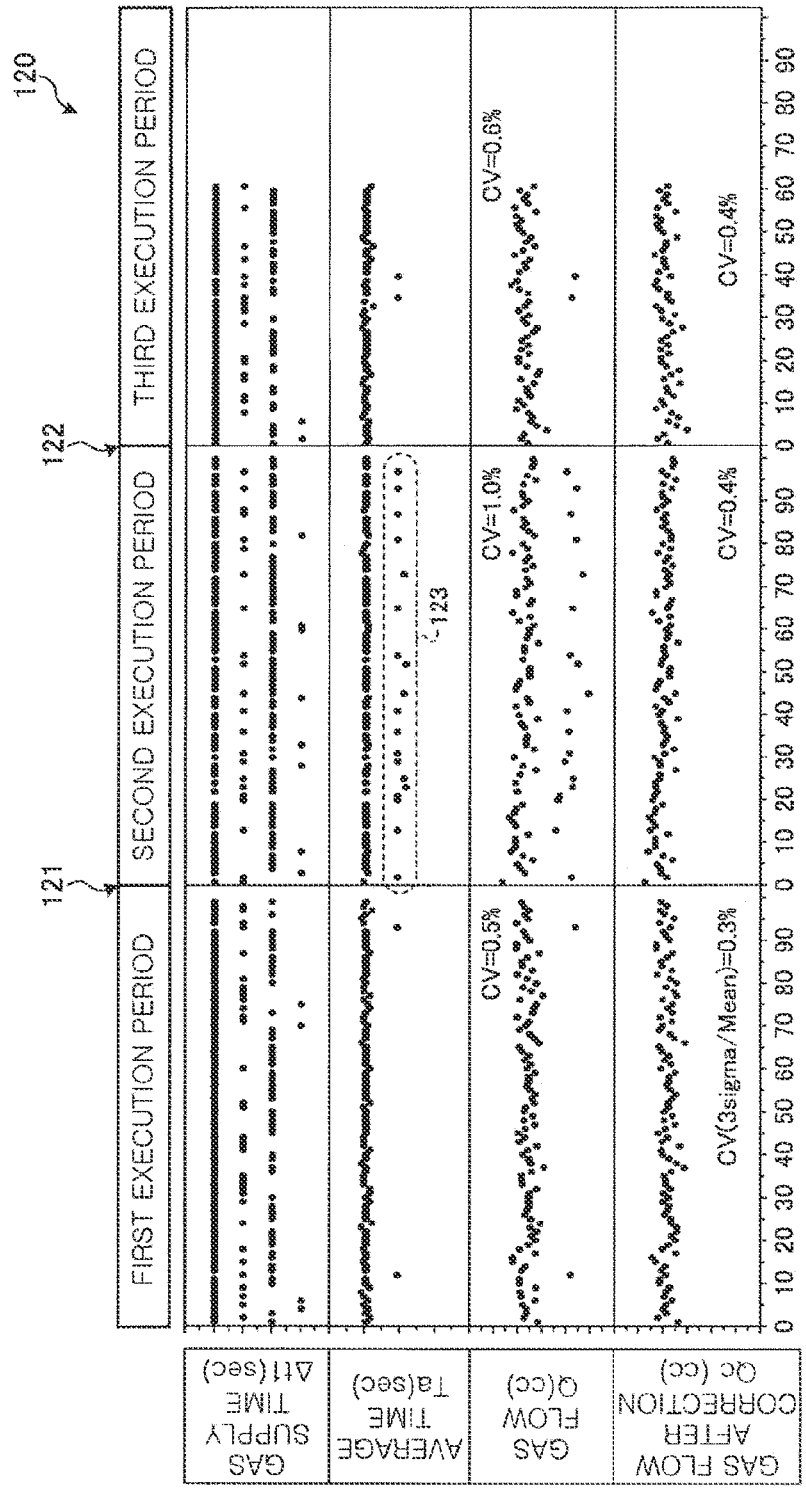
FIG. 6 provides an example of a gas flow measurement result.

FIG. 6 indicates an example of a gas flow measurement result. The graph 120 shown in FIG. 6 plots the result obtained by executing a recipe having ten or more steps S4, i.e., a recipe having ten or more gas pulses, for the gas flow measurement in the substrate processing system 10. In the graph 120, the processes from power on to power off of the substrate processing system 10 are performed three times. A boundary 121 indicates the boundary between a first power off and a second power on. A boundary 122 indicates the boundary between a second power off and a third power on. The horizontal axis of the graph 120 represents the number of executions of the recipe. For the first execution period, execution of the recipe and measurement of the gas flow was conducted 99 times. For the second execution period, execution of the recipe and measurement of the gas flow was done 100 times. For the third execution period, execution of the recipe and measurement of the gas flow was carried out 61 times.

The vertical axis of the graph 120 is divided into four sections, i.e., the gas supply time Δt1, the average time Ta, the gas flow Q, and the corrected gas flow Qc, from the top. The gas supply time Δt1 has a unit of second and plots each of the steps for one recipe. The average time Ta has a unit of second and plots an average value of all steps for one recipe. The gas flow Q has a unit of cc (standard state) and plots a total gas flow of all steps for one recipe. The corrected gas flow Qc has a unit of cc (standard state) and plots a value obtained by multiplying the total gas flow of all steps for one recipe by the correction coefficient cf.

The number of variations in the average time Ta from the second power on to the second power off is greater than that from the first power on to the first power off, as illustrated in a zone 123. This may be due to the effect of the power off and the power on the boundary 121. It is also considered that such variations occur depending on whether the normal process is being performed or the gas flow is being measured.

A variation coefficient CV of the gas flow from the first power on to the first power off is 0.5% for the gas flow Q, but is improved to 0.3% for the corrected gas flow Qc. The variation coefficient CV of the gas flow from the second power on to the second power off is 1.0% for the gas flow Q, but is improved to 0.4% for the corrected gas flow Qc. The variation coefficient CV of the gas flow from the third power on to the third power off is 0.6% for the gas flow Q, but is improved to 0.4% for the corrected gas flow Qc. By performing the correction of the present embodiment, the reproducibility of the gas flow can be improved from ±1.0% to ±0.4%.

(Correction of Flow Controller)

Figure 7:
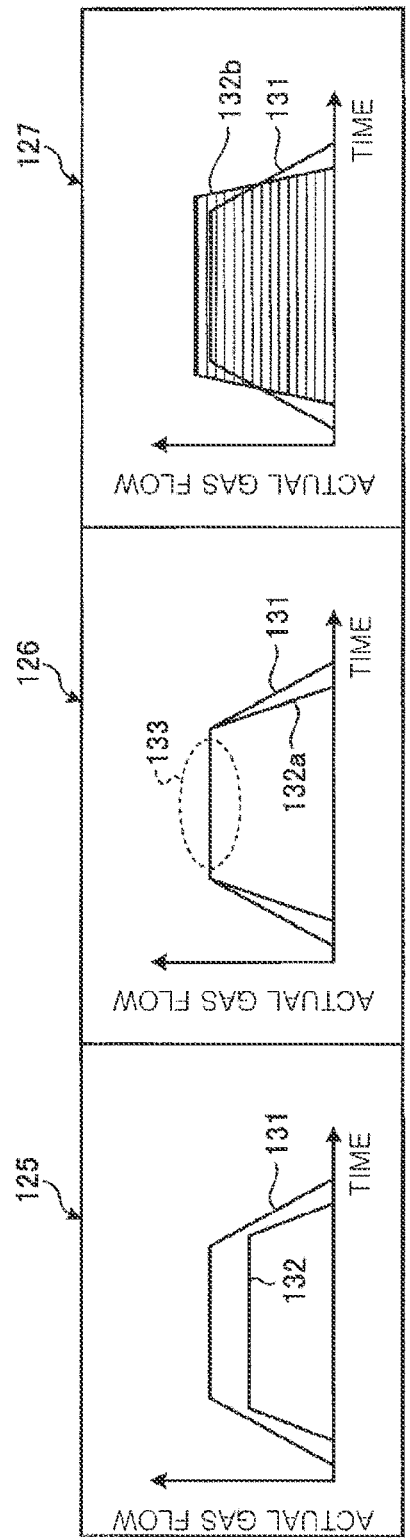
FIG. 7 describes an example of a correction method of the flow controller.
Figure 8:
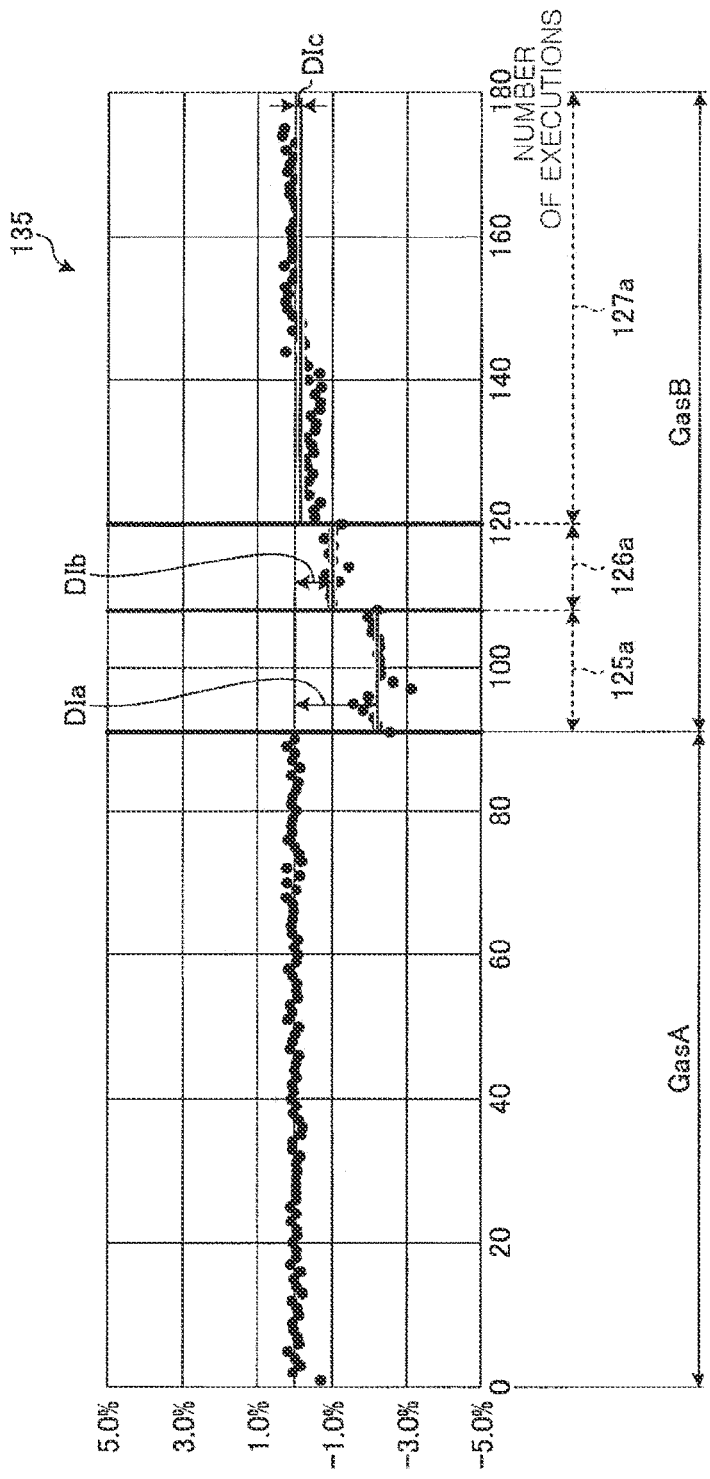
FIG. 8 explains an example of a correction result of the flow controller.

Next, the correction of the flow controller based on the gas flow measurement will be described with reference to FIGS. 7 and 8. FIG. 7 shows an example of a correction method of the flow controller. FIG. 8 shows an example of a correction result of the flow controller. As shown in FIG. 7, the case where a gas pulse 132 of a flow controller 18-$y$ to be corrected is adjusted to match a gas pulse 131 of a reference flow controller 18-$x$ is considered as an example of the case of correcting the differences between the flow controllers 18-1 to 18-M. In a graph 135 of FIG. 8, GasA corresponds to the gas pulse 131 and gasB corresponds to the gas pulse 132. Further, GasA and GasB correspond to different chambers 12-$a$ and 12-$b$. Here, the correction is performed such that GasB is adjusted with reference to GasA. The gas condition is set such that $C_4F_6$ gas is repeatedly supplied in a small gas flow for 10 steps or more, and a determination criterion is set such that the variation coefficient CV becomes ±0.9% or less.

A graph 125 in FIG. 7 shows the state before correction, in which the time is shorter and the actual gas flow is smaller in the gas pulse 132 than in the gas pulse 131. In a zone 125$a$ of FIG. 8 corresponding to the state before correction, a difference DIa is −2.21%. Next, as shown in the graph 126 of FIG. 7, CW (Continuous Wave) correction for adjusting a stable gas flow zone 133 is performed to obtain a gas pulse 132$a$. A difference DIb in a zone 126$a$ of FIG. 8 where the CW correction is performed is −1.02%, which is improved compared to the state before correction but does not satisfy the determination criterion. Further, as represented in a graph 127 of FIG. 7, ALE correction is performed in addition to the CW correction such that the area of the gas pulse 132 becomes equal to that of the gas pulse 131 to obtain a gas pulse 132$b$. A difference DIc in a zone 127$a$ of FIG. 8 where the CW correction and the ALE correction are performed is −0.12%, which is further improved compared to the state where the CW correction is performed and satisfies the determination criterion. In the graph 127, the gas flow of the stable gas flow zone 133 is adjusted such that the area of the gas pulse 132 becomes equal to that of the gas pulse 131 to obtain the gas pulse 132$b$. Further, in the graph 127, the corrected gas flow Qc is used to calculate the area of the gas pulse. In this manner, an etch rate (ER) machine difference can be improved by performing the ALE correction as well as the CW correction.

Modified Embodiment

Figure 9:
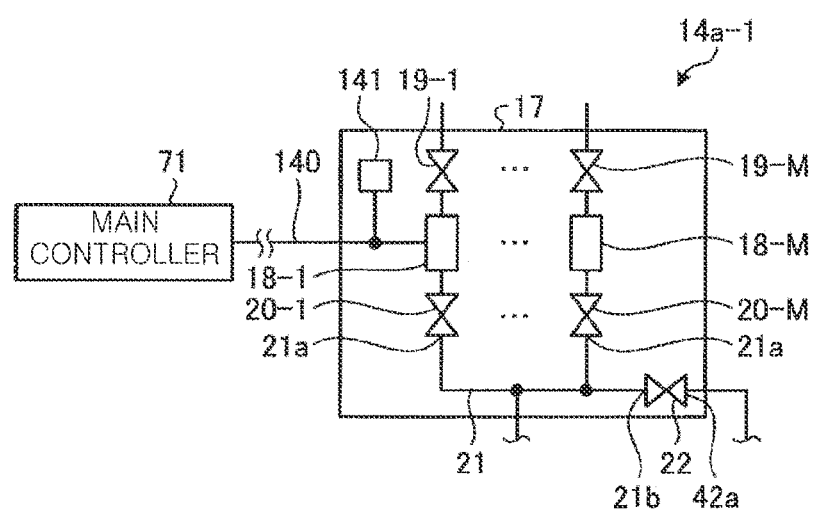
FIG. 9 represents an example of a gas supply unit according to a modification.

In the above-described embodiment, the error in the main controller 71 was corrected. However, the measuring unit connected to the communication path right before the flow controller 18-1 may measure the gas supply time. FIG. 9 shows an example of a gas supply unit according to a modified embodiment. In the gas supply unit 14$a$-1 shown in FIG. 9, a measuring unit 141 is connected to a communication path 140 that connects the main controller 71 and the flow controller 18-1 right before the flow controller 18-1. The measuring unit 141 measures, as the gas supply time Δt1, the time between the opening signal and the closing signal to the flow controller 18-1 for each of the gas pulses that are outputted from the main controller 71. By measuring the gas supply time Δt1 right before the flow controller 18-1, it is possible to correct the error in the main controller 71 and the error caused by, e.g., the timing delay in the communication path 140 from the main controller 71 to the flow controller 18-1. Therefore, the gas flow can be measured with higher accuracy than that in the above-described embodiment.

As described above, in accordance with the present embodiment, the gas flow measuring method includes: measuring the first pressure P1; supplying the gas; measuring the gas supply time; measuring the second pressure P2 and the temperature; measuring the third pressure P3; measuring the fourth pressure P4; calculating the gas flow Q; calculating the average time Ta; and correcting the gas flow Q. Specifically, the first pressure P1 is measured with respect to the gas filled in the first flow path (the first gas flow path 21 and the second gas flow path 42) connected to the flow controller 18-1 and the second flow path (the third gas flow path 43) connected to the first flow path. Then, the gas is supplied to the first flow path and the second flow path by repeating multiple times the gas supply to the first flow path through the flow controller 18-1 after the measurement of the first pressure P1 and the stop of the gas supply to the first flow path through the flow controller 18-1 after a predetermined time elapses from a start of the gas supply to the first flow path through the flow controller 18-1. The gas supply time $\Delta t1$ from the signal (opening signal) of starting the gas supply to the first flow path to the signal (close signal) of stopping the gas supply to the first flow path is measured, the signals being outputted from the controller (the main controller 71) to the flow controller 18-1 when the gas is supplied to the first flow path and the second flow path. After the gas is supplied to the first flow path and the second flow path, the second pressure P2 and the temperature of the gas filled in the first flow path and the second flow path are measured. The third pressure P3 of the gas filled in the second flow path is measured after the gas is exhausted from the second flow path in a state where the first flow path and the second flow path are not connected to each other. The fourth pressure P4 of the gas filled in the first flow path and the second flow path is measured in a state where the first flow path and the second flow path are connected to each other after the third pressure P3 is measured. The gas flow Q of the gas supplied to the first flow path and the second flow path through the flow controller 18-1 is calculated based on the first pressure P1, the second pressure P2, the third pressure P3, the fourth pressure P4, and the temperature. The average time Ta of the gas supply time $\Delta t1$ measured by repeating the gas supply and the stop of the gas supply multiple times is calculated. The gas flow Q is corrected based on the theoretical gas supply time Ts in the controller and the calculated average time Ta. As a result, the gas flow can be measured with high accuracy.

In accordance with the present embodiment, in the gas flow measuring method, the area of the gas pulse for the measured gas supply time $\Delta t1$ is adjusted to be equal to that of the gas pulse for the theoretical gas supply time Ts. Accordingly, the gas flow can be measured with high accuracy, and the ER machine difference can be improved.

In accordance with the modified embodiment, the gas supply time $\Delta t1$ is measured by the measuring unit 141 connected to the communication path 140 that connects the controller (main controller 71) and the flow controller 18-1 right before the flow controller 18-1. As a result, the gas flow can be measured with higher accuracy.

In accordance with the present embodiment, the gas flow measuring method further includes, before the first pressure P1 is measured, vacuumizing the first flow path and the second flow path by exhausting the gas from the processing space where the substrate is processed using the gas supplied through the flow controller 18-1 when the processing space is connected to the first flow path. Further, in the gas flow measuring method, the first pressure P1, the second pressure P2, the third pressure P3, and the fourth pressure P4 are measured when the processing space is not connected to the first flow path. As a result, the gas flow can be measured with high accuracy.

In the above-described embodiment, the pressure measured by the pressure sensor 47 is used. However, it is also possible to use the average of the pressure measured by the pressure sensor 47 and the pressure measured by the pressure sensor 48. Further, the gas flow measurement system 40 may include at least one of the pressure sensor 47 and the pressure sensor 48. In other words, the gas flow measurement system 40 may include one or more pressure sensors for measuring the pressure in the third gas flow path 43.

Further, in the above-described embodiment, in step S4 of the gas flow measuring method, a plurality of gas pulses are used to supply the gas to the first gas flow path 21. However, one gas pulse may be used to supply the gas to the first flow path 21. The gas flow measuring method can calculate the amount of gas supplied to the first gas flow path 21 with high accuracy even when one gas pulse is used to supply the gas to the first gas flow path 21.

Further, in the above-described embodiment, the first gas flow path 21, the second gas flow path 42, and the third gas flow path 43 are vacuumized by the turbo molecular pump 34-1 that vacuumizes the chamber 12-1 in step S2 of the gas flow measuring method. However, the first gas flow path 21, the second gas flow path 42, and the third gas flow path 43 may be vacuumized by another device, e.g., a gas exhaustion device separately provided at the gas flow measurement system 40. In this case as well, the gas flow measuring method can calculate the amount of gas supplied to the first gas flow path 21 through the flow controller 18-1 with high accuracy.

The embodiments of the present disclosure are illustrative in all respects and should not be considered restrictive. The above-described embodiments can be implemented in various forms. Further, the above-described embodiments may be omitted, replaced, or changed in various forms without departing from the scope of the appended claims and the gist thereof.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made departing from the spirit of the disclosures. The accompanying claims and their equivalents are intended to cover such forms or modifications as would fall within the scope and spirit of the disclosures.

The invention claimed is:

1. A gas flow measuring method comprising:
measuring a first pressure of a gas filled in a first flow path connected to a flow controller and a third flow path connected to the first flow path by way of a second flow path;
supplying, after the first pressure is measured, a gas to the first flow path and the third flow path, by way of the second flow path, in a state where a valve disposed between the second flow path and the third flow path is opened by repeating multiple times (i) gas supply to the first flow path through the flow controller, and (ii) stop of the gas supply to the first path through the flow controller, after a predetermined time from a start of the gas supply to the first flow path through the flow controller, and by diffusing the gas supplied to the first flow path to the third flow path by way of the second flow path;

measuring a gas supply time from a signal for starting the gas supply to the first flow path to a signal for stopping the gas supply to the first flow path, the signals being outputted from a controller to the flow controller when the gas is supplied to the first flow path and the third flow path by way of the second flow path;

measuring a second pressure and a temperature of the gas filled in the first flow path and the third flow path after the gas is supplied to the first flow path and the third flow path by way of the second flow path;

measuring a third pressure of the gas filled in the third flow path after the gas is exhausted from the third flow path in a state where the valve is closed and the first flow path and the third flow path are not connected to each other;

measuring, after the third pressure is measured, a fourth pressure of the gas filled in the first flow path and the third flow path in a state where the valve is opened and the first flow path and the third flow path are connected to each other by way of the second flow path;

calculating a gas flow of the gas supplied to the first flow path and the third flow path by way of the second flow path through the flow controller based on the first pressure, the second pressure, the third pressure, the fourth pressure, and the temperature;

calculating an average time of the gas supply time measured by repeating the gas supply and the stop of the gas supply multiple times; and correcting the calculated gas flow based on a theoretical gas supply time in the controller and the calculated average time.

2. The gas flow measuring method of claim 1, wherein said correcting comprises correcting the calculated gas flow such that an area of a gas pulse for the measured gas supply time becomes equal to an area of a gas pulse for the theoretical gas supply time.

3. The gas flow measuring method of claim 1, wherein the gas supply time is measured by a measuring unit connected right before the flow controller in a communication path that connects the controller and the flow controller.

4. The gas flow measuring method of claim 2, wherein the gas supply time is measured by a measuring unit connected right before the flow controller in a communication path that connects the controller and the flow controller.

5. The gas flow measuring method of claim 1, further comprising:

vacuumizing, before the first pressure is measured, the first flow path and the third flow path by exhausting the gas from a processing space when the processing space is connected to the first flow path, the processing space being used for processing a substrate therein using the gas supplied through the flow controller, wherein the first pressure, the second pressure, the third pressure, and the fourth pressure are measured when the processing space is not connected to the first flow path.

6. The gas flow measuring method of claim 2, further comprising:

vacuumizing, before the first pressure is measured, the first flow path and the third flow path by exhausting the gas from a processing space when the processing space is connected to the first flow path, the processing space being used for processing a substrate therein using the gas supplied through the flow controller, wherein the first pressure, the second pressure, the third pressure, and the fourth pressure are measured when the processing space is not connected to the first flow path.

7. The gas flow measuring method of claim 3, further comprising:

vacuumizing, before the first pressure is measured, the first flow path and the third flow path by exhausting the gas from a processing space when the processing space is connected to the first flow path, the processing space being used for processing a substrate therein using the gas supplied through the flow controller, wherein the first pressure, the second pressure, the third pressure, and the fourth pressure are measured when the processing space is not connected to the first flow path.

8. The gas flow measuring method of claim 4, further comprises:

vacuumizing, before the first pressure is measured, the first flow path and the third flow path by exhausting the gas from a processing space when the processing space is connected to the first flow path, the processing space being used for processing a substrate therein using the gas supplied through the flow controller, wherein the first pressure, the second pressure, the third pressure, and the fourth pressure are measured when the processing space is not connected to the first flow path.

9. A gas flow measuring apparatus for measuring a gas flow, comprising:

a first flow path connected to a flow controller;

a third flow path connected to the first flow path by way of a second flow path;

a valve disposed between the second flow path and the third flow path;

a pressure sensor configured to measure a pressure of a gas filled in the third flow path;

a temperature sensor configured to measure a temperature of the gas; and a controller, wherein the controller is configured to control the gas flow measuring apparatus to perform processes including:

measuring a first pressure of a gas filled in a first flow path connected to a flow controller and a third flow path connected to the first flow path by way of the second flow path;

supplying, after the first pressure is measured, a gas to the first flow path and the third flow path, by way of the second flow path, in a state where the valve is opened by repeating multiple times (i) gas supply to the first flow path through the flow controller, and (ii) stop of the gas supply to the first path through the flow controller, after a predetermined time from a start of the gas supply to the first flow path through the flow controller, and by diffusing the gas supplied to the first flow path to the third flow path by way of the second flow path;

measuring a gas supply time from a signal for starting the gas supply to the first flow path to a signal for stopping the gas supply to the first flow path, the signals being outputted from a controller to the flow controller when the gas is supplied to the first flow path and the third flow path by way of the second flow path;

measuring a second pressure and a temperature of the gas filled in the first flow path and the third flow path after the gas is supplied to the first flow path and the third flow path by way of the second flow path using the pressure sensor and the temperature sensor;

measuring a third pressure and a temperature of the gas filled in the third flow path using the pressure sensor after the gas is exhausted from the third flow path in a state the valve is closed and the first flow path and the third flow path are not connected to each other;

measuring, after the third pressure is measured, a fourth pressure of the gas filled in the first flow path and the third flow path using the pressure sensor in a state where the valve is opened and the first flow path and the third flow path are connected to each other by way of the second flow path;

calculating a gas flow of the gas supplied to the first flow path and the third flow path by way of the second flow path through the flow controller based on the first pressure, the second pressure, the third pressure, the fourth pressure, and the temperature;

calculating an average time of the gas supply time measured by repeating the gas supply and the stop of the gas supply multiple times; and correcting the calculated gas flow based on a theoretical gas supply time in the controller and the calculated average time.

* * * * *